June 13, 1944. R. M. STORER 2,351,303
APPARATUS FOR HARVESTING ICE
Filed Feb. 16, 1937 2 Sheets-Sheet 1

INVENTOR.
RICHARD M. STORER
BY
ATTORNEY.

June 13, 1944.　　　R. M. STORER　　　2,351,303
APPARATUS FOR HARVESTING ICE
Filed Feb. 16, 1937　　　2 Sheets-Sheet 2

INVENTOR.
RICHARD M. STORER
BY
ATTORNEY.

Patented June 13, 1944

2,351,303

UNITED STATES PATENT OFFICE 2,351,303

APPARATUS FOR HARVESTING ICE

Richard M. Storer, Denver, Colo., assignor to General Motors Corporation, Dayton, Ohio, a corporation of Delaware Application February 16, 1937, Serial No. 125,997

6 Claims. (Cl. 62—108.5)

This invention relates to molds for freezing liquids, of the type used in mechanical refrigeration, and relates more particularly to a combined grid and tray assembly in which a lever is used to exert a force against frozen matter, to release adhering portions of the same from the tray and/or grid.

In devices of this type heretofore in use, a lever has been employed to produce a relative movement between the tray and grid, which permits removal of the grid with the thereto attached frozen matter, from the tray.

Various means are provided for the release of the frozen matter from the grid, such as flexible partitions, movable partitions, and a cam action productive of a disruptive force on the frozen matter.

In my co-pending applications, Serial Numbers 60,074 and 71,965, filed January 21, 1936, and March 31, 1936, respectively, mechanism has been shown which utilizes the lever to first effect a removal of the grid from the tray, and thereafter by continued movement of the lever, to effect a release of frozen matter from the grid.

It is a primary object of the present invention to provide a freezing compartment, which is designed to effect a complete release of frozen matter therein in a single operative movement.

Another object of the invention is the production of frozen matter in a relatively inclined position, to permit a disrupting action by subsequent movement of such matter to a relatively upright position.

A further object of the invention is to produce a double release action in a single cam or lever actuation.

Still another object of the invention resides in the progressive release of a plurality of frozen blocks in a tray in an action in which each block is simultaneously released from the grid and the tray.

A still further object is to provide blocks of ice having a greater surface-area for heat absorption than is presented in rectangular blocks of the same volume.

Other objects reside in novel details of construction and novel combinations and arrangements of parts, all of which will appear more fully in the course of the following description.

For purposes of illustration, the invention will be described hereinafter, with reference to specific structural arrangements, but it is to be understood that various other structures embodying the same principle of operation may be devised, and accordingly, the invention will be described and claimed throughout in its broadest aspect. The present invention involves the use of a cam or lever action, by which movement is imparted to a transverse partition of the grid structure to effect a disrupting action on frozen matter formed by such partition, which simultaneously releases adhering surfaces of such frozen matter from the grid structure and from the tray in which it is supported.

Preferably, a lever, similar to that disclosed in my Patents Nos. 1,824,308 and 1,824,309, and my co-pending applications Serial Numbers 60,074 and 71,965, is mounted on the grid structure, controlling the movement of a member which moves the partitions as above stated.

Unlike the lever of the aforementioned disclosures, it is not necessary in the present instance that the lever be fulcrumed on the tray in order to produce the desired results.

The operation of the lever causes frozen matter to exert a leverage on the tray by its movement, imparted through the medium of the member, which is, in effect, a prying action sufficient to effectively separate the frozen matter from the tray.

Simultaneously with this movement, the movement of the partitions in the grid structure dislodges frozen matter adhering thereto. In this way, each block of frozen matter is simultaneously removed from the tray and from the grid structure in a single operative movement of the control mechanism. In order to afford a better understanding of the present invention, reference is made to the accompanying drawings illustrating embodiments of the invention, and in which, Figure 1 is a plan view of an ice tray and grid assembly, suitable for use in a mechanical refrigerator, and which embodies a form of the invention;

Figure 2:
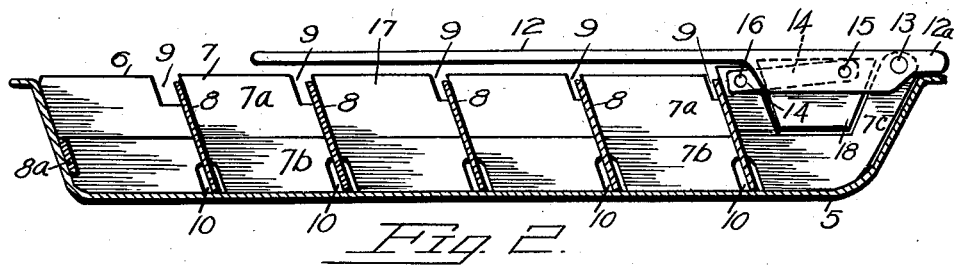
Figure 2 is a sectional view taken on the line 2—2 of Figure 1.

In the drawings, reference character 5 denotes an ice tray in which is removably mounted a grid assembly 6. The grid assembly is composed of a central longitudinal member 7 and a plurality of transverse members 8 that are loosely held in spaced relation to each other in an upper series of notches 9 and a lower series of notches 10 in the longitudinal member.

The longitudinal member, in the examples illustrated in Figures 1, 2, 3 and 4, is composed of two parts 7a and 7b that are relatively movable in a longitudinal direction, this movement being effected by means of a lever 12 that is pivoted at 13 to an upturned end 7c on the lower longitudinal member 7b. A link 14 is pivoted on the lever at 15 and is pivoted at 16 to the upper longitudinal member 7a.

Figure 1:
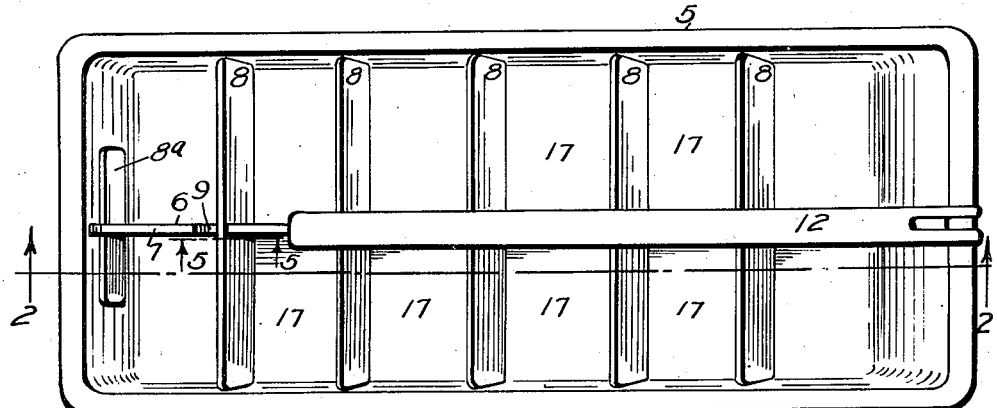

In the form of the invention shown in Figures 1 and 2, the lever 12 has a portion 12a that extends over the edge of the tray. In the form illustrated in Figures 3, 4, 6 and 7, the lever does not extend over the edge of the tray. On the end of the lower longitudinal member 7b opposite the lever 12 is a small transverse member 8a.

An important feature of the present invention resides in the relatively inclined position of the transverse members 8. In the form illustrated in Figures 1, 2, 6 and 7, each of these transverse members is straight.

Figure 3:
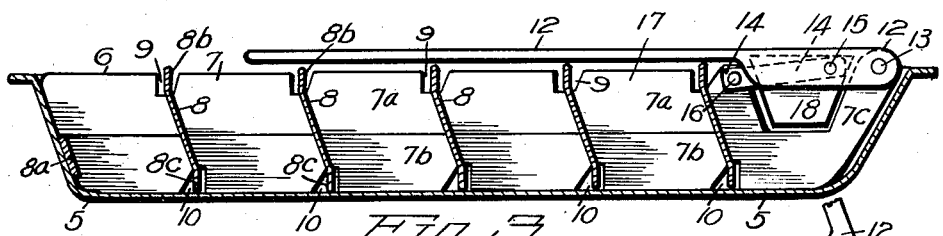
Figure 3 is a sectional view of an ice tray and grid assembly embodying a modified form of the invention.
Figure 4:
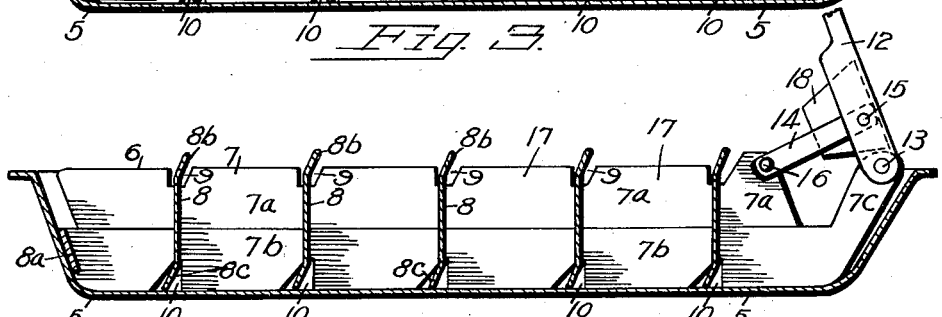
Figure 4 is a sectional view of an assembly similar to the one shown in Figure 3, illustrating the relative position of the various parts in an advanced stage of their operation.

In the form illustrated in Figures 3 and 4, each transverse member has at its upper edge a portion 8b and at its lower edge a portion 8c, that are substantially parallel to each other, but which are at an angle other than a straight angle, to the central portion of the inclined members. The essential feature of the foregoing construction is that an extremity of the wall surface be at an inclination to the intermediate surface and while in Figures 3 and 4 both the top and bottom portions of the walls are thus arranged, it will be apparent that when desired only one of such surfaces may be thus inclined.

Figure 5:
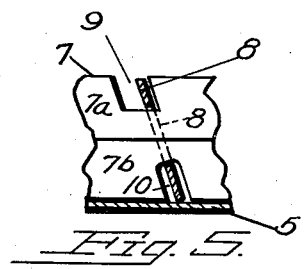
Figure 5 is a fragmentary sectional view taken on line 5—5 of Figure 1.

Figure 5 illustrates the relation of the transverse members to the longitudinal members, each transverse member 8 having a central slot 18 through which the longitudinal members 7a and 7b pass.

Figure 6:
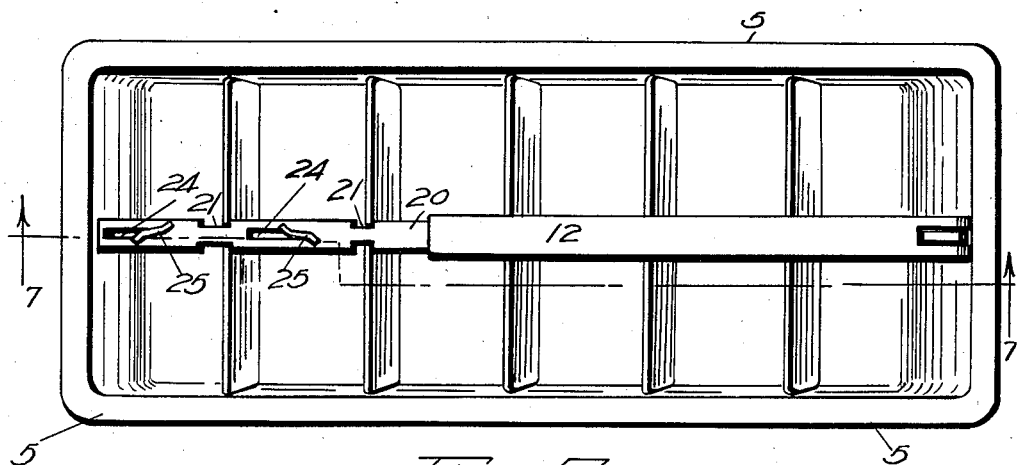
Figure 6 is a plan view of a freezing mold embodying a modified form of the invention.
Figure 7:
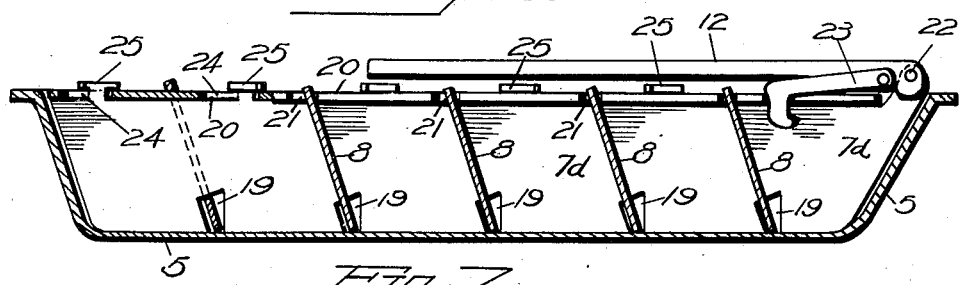
Figure 7 is a longitudinal section on the line 7—7 of Figure 6.

In the form of the invention illustrated in Figures 6 and 7, a longitudinal member 7d is provided with a series of notches 19 along its lower edge in which are assembled the inclined transverse members 8. A connecting member 20 is slidable along the upper edge of the member 7d, and is provided with a series of notches 21 that engage the individual members 8. These notches may be of progressively narrowing width or all of the same width, as preferred. The lever 12 is pivoted at 22 to the longitudinal member 7d, and a hook-like link 23 transforms arcuate movement of the lever to longitudinal movement of the connecting member 20 to impart angular movement to the transverse members 8.

The connecting member 20 is provided with slots 24 through which T projections 25 on the member 20, pass. The extremities of the projections are bent out of alinement for retaining the connecting member in correct proximity to the assembly and at the same time permitting its relative functional movement.

Figure 8:
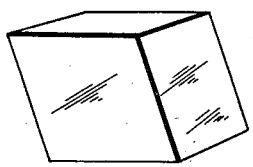
Figure 8 is a perspective view of a body of ice made according to the invention.

Figure 8 illustrates a typical ice-body formed, according to the invention, of an oblique prism shape. Since the surface-area of this shape is greater than the surface-area of a rectangular prism of the same volume, more rapid heat absorption will occur than would be possible with the rectangular ice prism.

Operation

In use, the various elements of the assemblies illustrated, are placed in the positions shown in Figures 1, 2, 3, 6 and 7, and water or other matter to be frozen is placed in the tray to a convenient depth, which normally would be somewhat below the upper rim of the tray, and is frozen in a manner well-known in the art.

Thereafter, the assembly as a whole may be removed from the refrigerator, and to facilitate the individual removal of the blocks of frozen matter, which conform to the size and shape of compartments 17 defined by the tray and grid, the lever 12 is raised to approach a vertical position, as shown in Figure 4.

Movement is imparted by means of the link 14, to the upper movable longitudinal member 7a, which rotates the transverse members 8 to approach a substantially vertical position as shown. The notched relationship between the cross members and the longitudinal members permits this relative movement, while retaining the cross members in their respective retaining notches 9 and 10.

A section 18 is attached to the under side of the lever and is in alinement with the movable longitudinal member 7a so that when the lever is raised the member 7a advances into the space left by the section 18.

In the form of the invention shown in Figures 6 and 7, the cross members 8 are rotated through the intermediary of the connecting member 20 which is moved in a longitudinal direction by the lever 12 and link 23.

Since the solidified bodies of frozen matter are of the shape having inclined surfaces conforming to the normal position of the cross members, rotation of the inclined members toward the vertical will dislodge the frozen matter from the tray and the cross members simultaneously by the same movement of the various parts.

In the form shown in Figures 1 and 2, the raising of the lever 12 will cause the end 12a thereof to bear upon the upper edge of the tray and thereby tend to raise the entire grid assembly upwardly from the bottom of the tray. This movement may occur simultaneously with the relative movement of the individual cross members, or the movement of the cross members may be delayed, this timing being controlled by the width of the upper notches 9 in the longitudinal member 7a.

It will be noted in the assembly illustrated in Figure 2 that the notches 9 are not of the same width, but progressively widen from the right toward the left. This arrangement results in a progressive release of the bodies of frozen matter, since the narrower notches will engage their respective cross members and move them sooner than the wider notches engage and move their associated cross members. Thus in these forms of the invention the lever is actuated exclusive of engagement with the tray or acts directly on the grid to, among other advantages, avoid damage to the tray end wall.

In the form shown in Figures 3, 4 and 7, the movement of the lever causes angular movement of the ice blocks in the compartment whereby these blocks not only are broken loose from the cross members of the grid, but also exert a force against the tray bottom, which breaks their adherence therewith, thus permitting the grid to be lifted from the tray. No bearing of the lever on the tray is required in this operation.

The cross member 8a in the assemblies illustrated is not moved by the movement of the longitudinal member 7a, but it is attached to the lower longitudinal member 7b to facilitate dislodgment of the bodies of frozen matter in the compartments adjacent thereto.

This effect is gained by the relative movement of the rotary partition next adjacent and also by a general movement of the grid relative to the tray.

The shape of the cross members as illustrated in Figures 3 and 4, has the advantage that they slide along the bottom of the interior of the tray more readily under certain conditions than do the straight cross members as illustrated in Figures 1, 2, 6 and 7. However, the principle of operation is very similar and it will be understood that either shape of cross member and either type of lever handle may be used in any desired combination, and that the notches controlling the movement of the cross members may all be of the same or of varying widths in any form of the invention.

In the position shown in Figures 1, 2, 3, 6 and 7 the pivotal axis of the lever-handle and the pivotal connection of the link to the lever are in substantial alinement with the point of contact of the link on the movable longitudinal member so that the inclined transverse grid members are locked in place as shown in these figures, when the lever is down, the link serving as a toggle member with the lever.

The inclined cross members undergo angular movement by virtue of the fact that there is relative movement of their upper and lower retaining notches. In the examples illustrated the axis of the angular movement would normally lie adjacent the lower edge of the members but this may vary according to the depth and width of the retaining notches. And if the entire grid assembly was outside of the tray, both the upper and lower longitudinal members might move with reference to each other thus changing the location of the axis of rotation of the cross members.

The forms illustrated and described herein are merely illustrative of the principles involved in the invention and various structural embodiments may be used without departing from the spirit and scope of the invention.

Thus, while a lever or cam action is shown and described, any rotation of the frozen blocks, or corresponding movement thereof, which simultaneously releases them from the tray and grid constitutes the essential features of the present operation, and is, in fact, a part of the present invention.

In the type of lever as illustrated in Figures 1 and 2 having a bearing against any part of the tray the release of some or all of the frozen matter from the tray may occur before its release from the grid. With the type of lever as illustrated in Figures 3, 4, 6 and 7, or with any other mechanical element that acts to rotate the cross members without contacting the tray, the dislodgment of the frozen bodies from the tray and from the grid would normally occur simultaneously.

What I claim and desire to secure by Letters Patent is:

1. In a device of the character described, a grid assembly comprising a plurality of transverse walls mounted for angular movement relative to a surface on which they are supported and normally inclined thereto, a longitudinal member having spacing-notches providing shoulders for engaging the wall members, a movable connecting member supported by the longitudinal member for engagement with the wall members and having a slot-like aperture, a retaining-projection on the longitudinal member passing through the aperture in the connecting member, and mechanism for rotating the wall members through the intermediary of the connecting member.

2. In a device of the character described, a mold element having a wall formed of members superposed one above the other, the uppermost member being mounted for lengthwise movement relative to the other member and terminating in spaced relation to a corresponding end of the same, and a lever in operative connection with the uppermost member to impart lengthwise movement thereto and having a projection disposed to fill the space at the end of the uppermost member when the lever is in its inactive position.

3. In a device of the character described, a mold element having a wall formed of members superposed one above the other, the uppermost member being mounted for lengthwise movement relative to the other member and terminating in spaced relation to an upstanding end of the lowermost member, and a lever fulcrumed on the upstanding end in operative connection with the uppermost member to impart lengthwise movement thereto and having a projection disposed to fill the space at the end of the uppermost member when the lever is in its inactive position.

4. In combination, a tray having a unitary grid structure removably disposed therein, said grid structure comprising a longitudinal wall formed of two superimposed parts and a plurality of spaced apart transverse walls movably connected to said longitudinal wall to provide a plurality of compartments in which a liquid is frozen into individual ice blocks, the upper part of said longitudinal wall being movable lengthwise of the lower part thereof for engaging and tilting said transverse walls to break the bond between the ice blocks and said tray and grid, one end of the lower part of said longitudinal wall having an upwardly directed projection thereon, and an operating lever pivotally mounted upon said projection and having a link connection with the upper part of said longitudinal wall to cause said relative movement between the longitudinal wall parts and tilting of said transverse walls upon operation thereof, said lever acting directly on the grid only.

5. In combination, a tray having an inclined wall, a unitary grid structure removably disposed in said tray, said grid structure comprising a longitudinal member and a plurality of spaced apart substantially non-flexible members extending transversely thereto and cooperating therewith to form compartments on each side of said longitudinal member in which a liquid is frozen into individual ice blocks, said transverse members being mounted for movement relative to said longitudinal member, an element on the grid adapted to engage said transverse members and impart movement thereto in a direction toward the inclined tray wall to break the bond between the ice blocks and said tray and grid, and an operating lever pivotally mounted on the grid and having a connection with said element for moving same, said lever acting directly on the grid only.

6. In combination, a tray having a unitary grid structure removably disposed therein, said grid structure comprising a longitudinal wall member formed of two superimposed parts one of which is movable lengthwise relative to the other and a plurality of spaced apart transverse wall members movably connected to said longitudinal wall member to provide a plurality of compartments in which a liquid is frozen into individual ice blocks, said transverse wall members being tiltable when one of said longitudinal wall member parts is moved lengthwise relative to the other to break the bond between the ice blocks and said tray and grid, and an operating lever pivotally mounted on one part of said longitudinal wall member and having a connection with the other part thereof to cause said relative movement between the parts of said longitudinal wall member and tilting of said transverse wall members, said lever acting directly on the grid only.

RICHARD M. STORER.